United States Patent
Seko et al.

(10) Patent No.: US 11,773,901 B2
(45) Date of Patent: Oct. 3, 2023

(54) SELF-ALIGNING ROLLER BEARING

(71) Applicant: NTN CORPORATION, Osaka (JP)

(72) Inventors: Kazumasa Seko, Kuwana (JP); Masaki Nakanishi, Kuwana (JP); Takashi Yamamoto, Kuwana (JP)

(73) Assignee: NTN CORPORATION, Osaka (JP)

( * ) Notice: Subject to any disclaimer, the term of this patent is extended or adjusted under 35 U.S.C. 154(b) by 79 days.

(21) Appl. No.: 17/486,011

(22) Filed: Sep. 27, 2021

(65) Prior Publication Data

US 2022/0010836 A1 Jan. 13, 2022

Related U.S. Application Data

(63) Continuation of application No. PCT/JP2020/012628, filed on Mar. 23, 2020.

(30) Foreign Application Priority Data

Apr. 5, 2019 (JP) .................. 2019-072713

(51) Int. Cl.
*F16C 23/08* (2006.01)
*F16C 19/38* (2006.01)
(Continued)

(52) U.S. Cl.
CPC .............. *F16C 23/08* (2013.01); *F16C 19/38* (2013.01); *F16C 23/086* (2013.01); *F16C 33/34* (2013.01); *F16C 33/49* (2013.01); *F16C 2206/04* (2013.01); *F16C 2223/30* (2013.01); *F16C 2240/54* (2013.01); *F16C 2240/60* (2013.01)

(58) Field of Classification Search
CPC ........ F16C 19/38; F16C 23/08; F16C 19/082; F16C 19/086; F16C 33/34; F16C 33/49; F16C 33/495; F16C 33/497; F16C 33/498
See application file for complete search history.

(56) References Cited

U.S. PATENT DOCUMENTS 10,527,091 B2 * 1/2020 Yasuda ................... F16C 19/38
10,655,674 B2 5/2020 Yamamoto et al.
(Continued)

FOREIGN PATENT DOCUMENTS

JP 2010-112527 A 5/2010
JP 2011-174538 A 9/2011
(Continued)

OTHER PUBLICATIONS

Translation of WO2020/067334 obtained Feb. 9, 2023.*
(Continued)

*Primary Examiner* — James Pilkington

(57) ABSTRACT

Provided is a self-aligning roller bearing for supporting a main shaft of a wind power generator, the self-aligning roller bearing including an inner ring, an outer ring, two rows of rollers, and retainers. Each of the rollers has an outer peripheral surface formed with a DLC coating having a multilayer structure. The DLC coating has a film thickness of 2.0 μm or larger. A base material of each of the rollers has an external surface having a surface roughness of Ra≤0.3 and RΔq≤0.05. The DLC coating having the multilayer structure includes layers having stepwisely increasing film hardnesses such that a layer situated closer to outside has a higher hardness.

4 Claims, 9 Drawing Sheets

(51) Int. Cl.
*F16C 33/34* (2006.01)
*F16C 33/49* (2006.01)

(56) References Cited

U.S. PATENT DOCUMENTS

| | | | |
|---|---|---|---|
| 10,697,492 | B2 | 6/2020 | Yamamoto et al. |
| 10,883,544 | B2 | 1/2021 | Seko et al. |
| 11,542,985 | B2 * | 1/2023 | Nakanishi ............... F16C 33/34 |
| 2018/0202489 | A1 | 7/2018 | Hori et al. |
| 2019/0024712 | A1 | 1/2019 | Yamamoto et al. |
| 2019/0331164 | A1 | 10/2019 | Yamamoto et al. |
| 2019/0331165 | A1 | 10/2019 | Seko et al. |

FOREIGN PATENT DOCUMENTS

| | | | |
|---|---|---|---|
| JP | 2015-102144 | * | 6/2015 |
| JP | 2017-180832 | A | 10/2017 |
| JP | 2018-115761 | A | 7/2018 |
| JP | 2018-115762 | A | 7/2018 |
| WO | WO2017/047506 | A1 | 3/2017 |
| WO | WO2018/164139 | * | 9/2018 |
| WO | WO2020/067334 | * | 4/2020 |

OTHER PUBLICATIONS

Translation of JP2015-102144 obtained Feb. 9, 2023.*
Translation of WO2018/164139 obtained Feb. 9, 2023.*
International Search Report for International Patent Application No. PCT/JP2020/012628 dated Jun. 16, 2020.
International Preliminary Report on Patentability and Written Opinion for International Patent Application No. PCT/JP2020/012628 dated Oct. 14, 2021.
Chinese Office Action dated Nov. 9, 2022 in Chinese Patent Application No. 202080026354.7 (6 pages; 5 pages English translation).
Japanese Office Action dated Oct. 18, 2022 in Japanese Patent Application No. 2019-072713 (4 pages 4 pages English translation).
Extended Supplementary European Search Report dated Nov. 8, 2022 in European Patent Application No. 20781962.4 (8 pages).

* cited by examiner

SELF-ALIGNING ROLLER BEARING

CROSS REFERENCE TO THE RELATED APPLICATION

This application is a continuation application, under 35 U.S.C. § 111(a), of international application No. PCT/JP2020/012628, filed Mar. 23, 2020, which claims priority to Japanese patent application No. 2019-072713, filed Apr. 5, 2019, the entire disclosures of all of which are herein incorporated by reference as a part of this application.

BACKGROUND OF THE INVENTION

Field of the Invention

The present invention relates to a self-aligning roller bearing for supporting a main shaft of a wind power generator.

Description of Related Art

Self-aligning roller bearings are often used as bearings for main shafts of wind power generators. Such a self-aligning roller bearing serving as a bearing for a main shaft of a wind power generator is subjected to radial load due to the weight of blades or a rotor head per se and additionally to axial load due to wind force. In such a situation, of the two rows of rollers, one row of rollers receives substantially only radial load, whereas the other row of rollers receives both of radial load and axial load. For this reason, the rollers in the row which also receives the axial load are subjected to larger contact surface pressure than that to the rollers in the row which only receives the radial load, so that surface damage and wear are likely to occur on rolling surfaces of the rollers and a raceway surface of an outer ring, causing these rollers to have shorter rolling life. The shorter rolling life of this row of rollers determines substantial service life of the entire bearing.

In general, to address the issue, high-viscosity lubricants are used to improve oil film formation capability. However, high-viscosity lubricants are not suitable for lean lubrication and require bothersome maintenance of the lubricants. To solve such a problem, it has been proposed to apply a DLC coating on the rolling surfaces of the rollers (for example, Patent Document 1). DLC stands for diamond-like carbon.

RELATED DOCUMENT

Patent Document

[Patent Document 1] JP Laid-open Patent Publication No. 2017-180832

SUMMARY OF THE INVENTION

The invention described in Patent Document 1 includes applying a DLC coating on the rollers so as to suppress wear of the raceway surfaces and improve the bearing service life. The DLC coating applied as a single layer, however, has a problem of film peeling, and it is still desired to further improve the bearing service life.

In order to solve the above problem, an object of the present invention is to provide a self-aligning roller bearing configured to support a main shaft of a wind power generator, the self-aligning roller bearing being capable of suppressing wear of bearing raceway surfaces and having excellent peeling resistance of a DLC coating so as to further extend service life of the bearing.

The present invention provides a self-aligning roller bearing configured to support a main shaft of a wind power generator, the self-aligning roller bearing including:
an inner ring; an outer ring; two rows of rollers interposed between a raceway surface of the inner ring and a raceway surface of the outer ring; and a retainer configured to retain the respective rows of the rollers, wherein the raceway surface of the outer ring has a spherical shape continuously extending over the two rows of the rollers, each of the rollers having an outer peripheral surface having a cross-sectional shape matching the raceway surface of the outer ring, each of the rollers has a DLC coating having a multilayer structure on the outer peripheral surface,
the DLC coating has a film thickness of 2.0 µm or larger,
a base material of each of the rollers has an external surface having a surface roughness of Ra≤0.3 and RΔq≤0.05, and
the DLC coating having the multilayer structure includes layers having stepwisely increasing film hardnesses such that a layer situated closer to outside has a higher hardness.

According to this constitution, the DLC coating is applied to the outer peripheral surfaces of the rollers, so that the rollers have improved wear resistance. Further, this eliminates the necessity of using a high-viscosity lubricant, enables lean lubrication, and makes it easy to maintain the lubricant. Since the DLC coating has a multilayer structure, and the respective layers have stepwisely increasing film hardnesses such that a layer situated closer to the outside has a higher hardness, it is possible to increase a film hardness of the outermost layer to further improve wear resistance, while keeping the innermost layer in contact with the base material relatively soft to achieve good adhesion to the base material. Thus, the DLC coating can have excellent peeling resistance. Where the DLC coating has a too small film thickness, it is difficult to obtain sufficient wear resistance and mechanical strength. A film thickness of 2.0 µm or larger makes it possible to provide a film having excellent wear resistance and mechanical strength. It should be noted that where the DLC coating has a film thickness exceeding 5.0 µm, the coating is prone to peeling. Therefore, the DLC coating preferably has a film thickness of 5.0 µm or smaller. The outer peripheral surfaces on which the DLC coating is to be applied have, as values indicating its roughness, an arithmetic average roughness Ra of 0.3 or smaller and a root mean square slope RΔq of 0.05 or smaller, so that they are less aggressive to an opposing material, i.e., to the raceway surfaces of the inner and outer rings.

In the self-aligning roller bearing according to the present invention, the retainer may include an annular portion and a plurality of pillar portions axially extending from the annular portion at a plurality of locations in a circumferential direction of the annular portion such that the retainer is formed in a comb shape,
the pillar portions may have pocket surfaces which are formed as cylindrical surfaces and define pockets, a center of each of the cylindrical surfaces being inclined with respect to the pillar portions such that distal ends of the pillar portions approach a center of the retainer, and
each of the pillar portions may be formed with a tapered portion on an outer diametric surface of a distal end of that pillar portion, the tapered portion approaching an inner diametric side of the retainer as the tapered portion extends to a most distal end of that pillar portion.

In the case of this constitution, since the pocket surfaces of the pillar portions are formed as cylindrical surfaces, the rollers can be reliably retained. The centers of the cylindrical surfaces serving as the pocket surfaces of the pillar portions are inclined such that the distal ends of the cylindrical surfaces extend toward the inner diametric side with respect to the direction in which the pillar portions extend. Accordingly, if the tapered portions were not provided, each pillar portion would have a largest pillar portion width at the most distal end of that pillar portion when viewed from the outside in the radial direction of the retainer toward the center side of the retainer. Therefore, incorporation of the rollers into the pockets would be difficult because the wider outer diametric portions of the distal ends of the pillar portions would interfere such an operation, and the wide outer diametric portions of the distal ends of the pillar portions would be useless parts which do not contribute to strength or functionally provide any good effect. However, by forming the tapered portions approaching the inner diametric side of the retainer as described above, it is possible to eliminate the useless parts, which would otherwise prevent incorporation of the rollers, so as to facilitate incorporation of the rollers and to reduce the weight of the retainer. Since incorporation of the rollers is facilitated, it is not necessary to greatly deform the retainer during the incorporation, so that shape deterioration due to deformation of the retainer is prevented.

In the case of this constitution, the retainer may preferably have, with respect to a pitch circle diameter PCD, an outer diameter in a range of PCD×102% to PCD×105%, and an inner diameter in a range of PCD×95% to PCD×98%, and parts of the pillar portions which define the pockets may have a length equal to or shorter than 65% of a roller length.

Where the parts of the pillar portions which define the pockets have a length equal to or shorter than 65% of a roller length, it is possible to design the retainer with a minimum volume while securing the pocket surfaces at the positions where the retainer mainly holds the rollers (at roller maximum diameter positions) such that the retainer has comparable performance to that of a conventional product without the tapered portions. In such a case, the outer diameter of the retainer is in range of PCD×102% to PCD×105%, and the inner diameter of the annular portion is in range of PCD×95% to PCD×98%.

The tapered portion of each the pillar portions of the retainer may more preferably extend from a position at a maximum diameter angle which is an angle of the retainer at a position where the rollers have a maximum diameter or from a position closer to the distal end of that pillar portion with respect to the position at the maximum diameter angle. Since the tapered portions extend from the positions at the maximum diameter angle or from positions closer to the distal ends of the pillar portions with respect to the positions at the maximum diameter angle, the rollers can be securely retained, even if the tapered portions are provided.

Where the retainer is provided with the tapered portions, each of the pillar portions may preferably have a smallest pillar portion width at the most distal end of that pillar portion when viewed from the outside in the radial direction of the retainer toward the center side of the retainer. Since the pillar portions have a smallest width at their most distal ends, incorporation of the rollers can be facilitated.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

DESCRIPTION OF THE EMBODIMENTS

Figure 1:
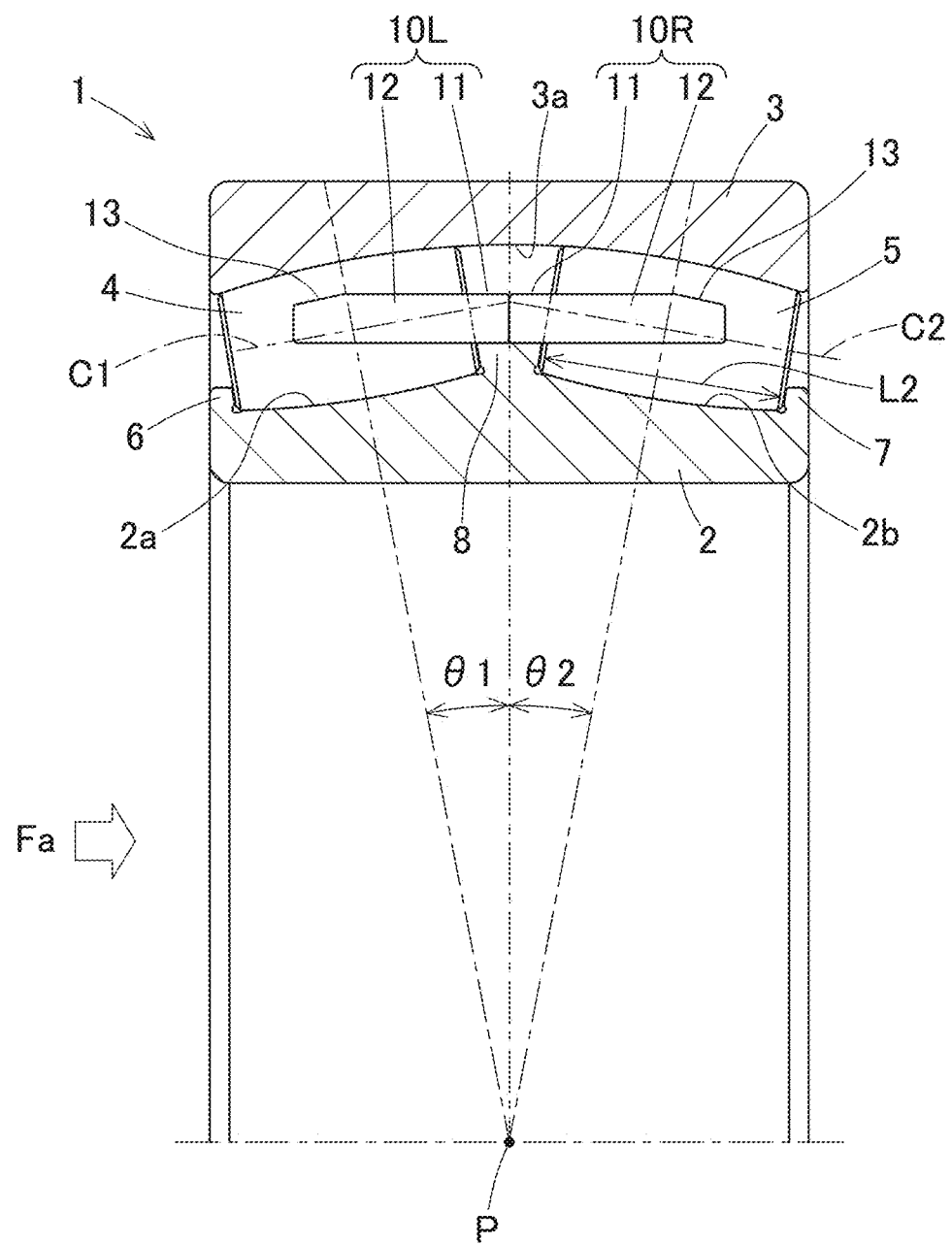
FIG. 1 is a sectional view of a self-aligning roller bearing according to a first embodiment of the present invention.

A double-row self-aligning roller bearing 1 according to a first embodiment of the present invention (hereinafter, sometimes simply referred to as "bearing 1") will be described with reference to FIG. 1 to FIG. 11. The self-aligning roller bearing 1 includes an inner ring 2, an outer ring 3, and two rows of rollers 4, 5 arranged on left and right sides in a bearing widthwise direction (an axial direction of the bearing) and interposed between the inner ring and the outer ring. The outer ring 3 has a spherical raceway surface 3a.

The rollers 4, 5 in the respective left and right rows each has an outer peripheral surface having a cross-sectional shape matching the raceway surface 3a of the outer ring 3. In other words, each of the rollers 4, 5 has an outer peripheral surface in the form of a curved surface of a solid of revolution obtained by rotating a circular arc matching the raceway surface 3a of the outer ring 3 around a center axis C1, C2. The inner ring 2 is formed with two rows of raceway surfaces 2a, 2b having cross-sectional shapes matching the outer peripheral surfaces of the rollers 4, 5 in the respective left and right rows. The inner ring 2 is formed with small flanges 6, 7 at opposite ends of an outer peripheral surface of the inner ring. The inner ring 2 is formed with an intermediate flange 8 at a center part of the outer peripheral surface of the inner ring, that is, between the rollers 4 in the left row and the rollers 5 in the right row. The present embodiment represents an exemplary application to a self-aligning roller bearing 1 in which left and right rows have a symmetrical configuration and have a same contact angle $\theta1$, $\theta2$. It should be noted that the terms "left" and "right" as used herein merely indicate a relative positional relation in the axial direction of the bearing for the sake of convenience. In the present specification, the "left" and "right" sides correspond to the left and right sides in the drawings to facilitate understanding.

The respective left and right rows of rollers 4, 5 are retained by retainers 10L, 10R. The retainer 10L for the left row includes an annular portion 11 and a plurality of pillar portions 12 extending leftward from the annular portion and retains the rollers 4 of the left row in pockets defined between the pillar portions 12. The retainer 10R for the right row includes an annular portion 11 and a plurality of pillar portions 12 extending rightward from the annular portion and retains the rollers 5 of the right row in pockets defined between the pillar portions 12.

Figure 2:
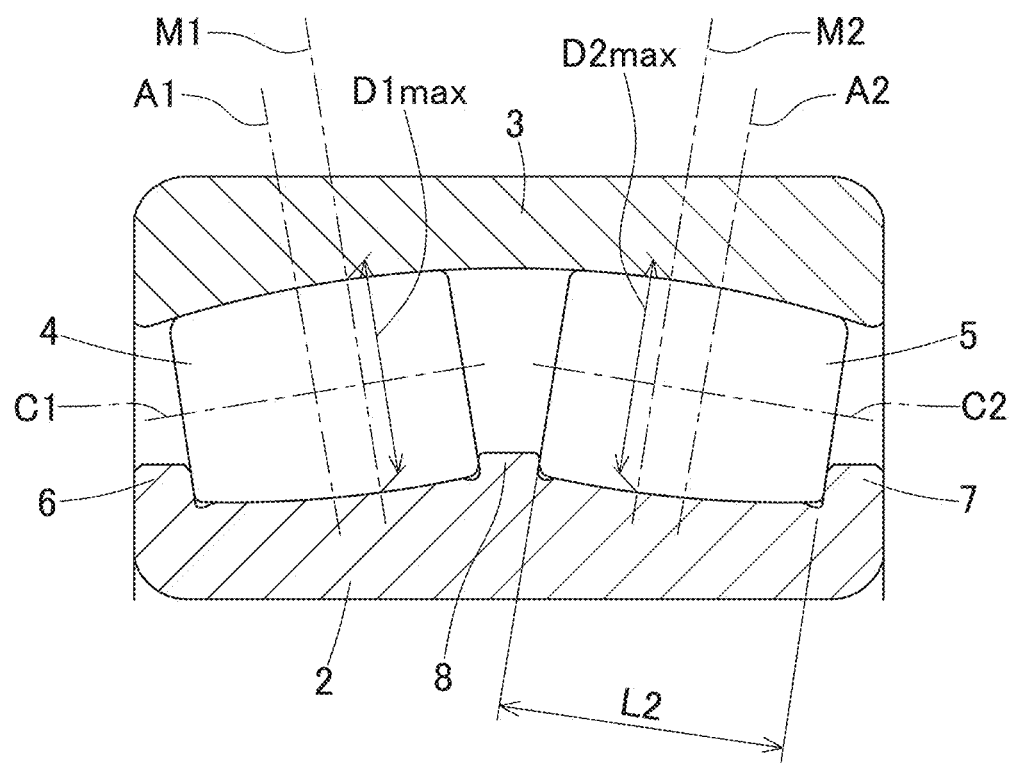
FIG. 2 illustrates asymmetrical rollers.

As exaggeratedly illustrated in FIG. 2, the rollers 4, 5 in the respective left and right rows are asymmetrical rollers each having a maximum diameter D1max, D2max at a position M1, M2 displaced from a center A1, A2 of a roller length. Each roller 4 in the left row has the maximum diameter D1max at a position displaced rightward with respect to the center A1 of the roller length, and each roller 5 in the right row has the maximum diameter D2max at a position displaced leftward with respect to the center A2 of the roller length. The rollers 4, 5 in the respective left and right rows, which are constituted by such asymmetrical rollers, are subjected to an induction thrust load. In order to receive the induction thrust load, the inner ring 2 is provided with the intermediate flange 8. The combination of the asymmetrical rollers 4, 5 and the intermediate flange 8 provides good guiding accuracy because the rollers 4, 5 are guided at three points, namely, the inner ring 2, the outer ring 3, and the intermediate flange 8.

Figure 3:
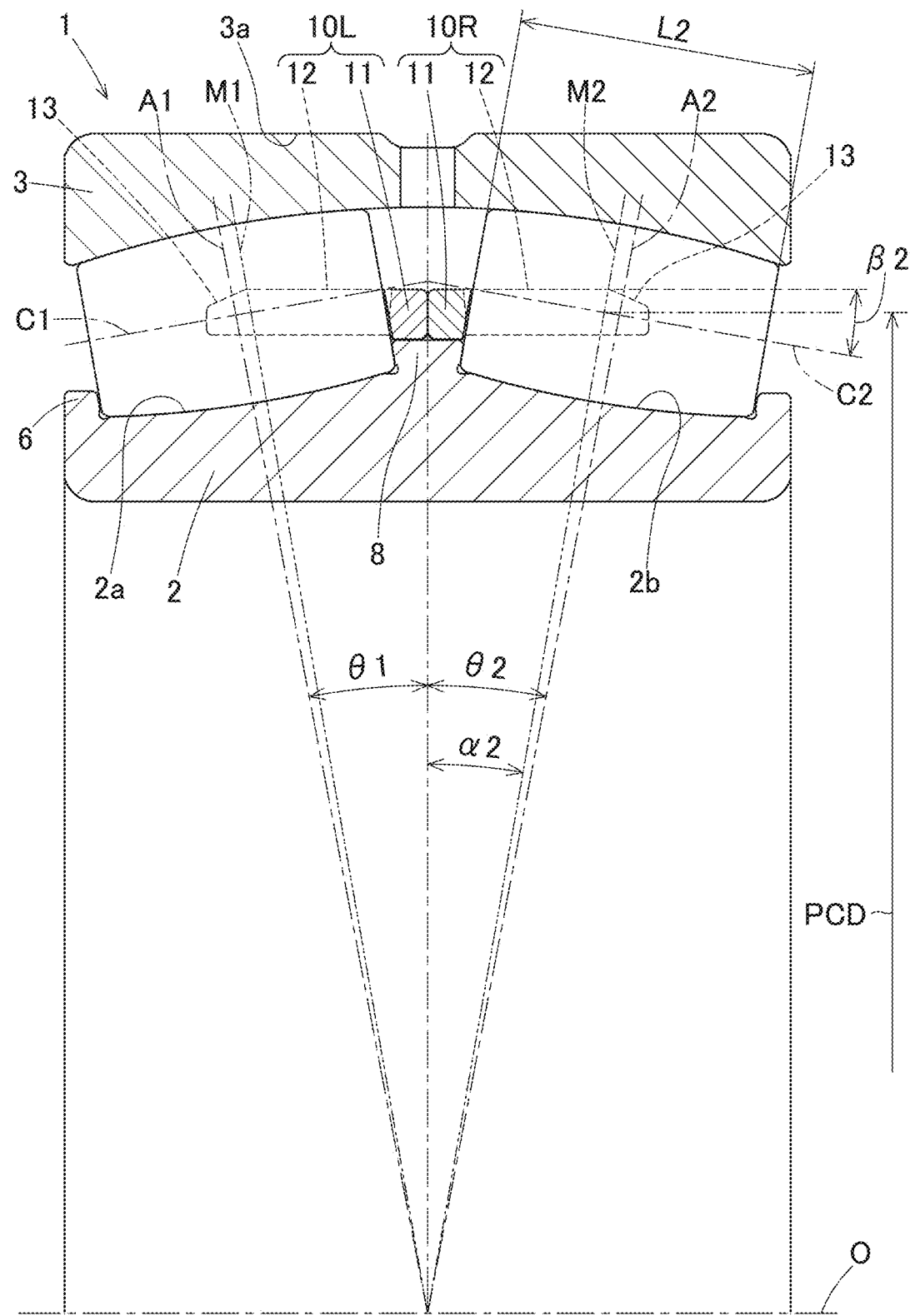
FIG. 3 is a sectional view illustrating inclination angles of retainers of the self-aligning roller bearing.
Figure 13:
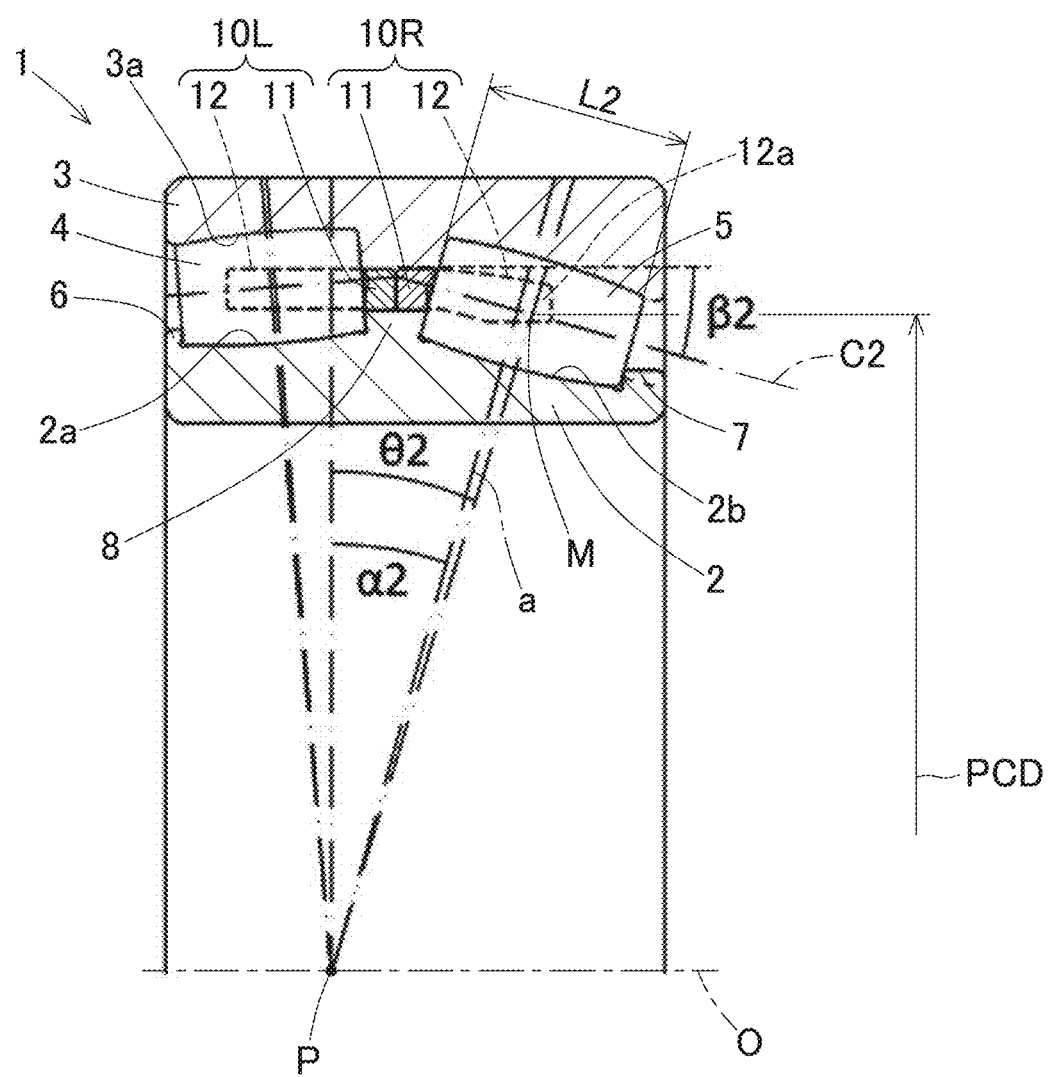
FIG. 13 is a sectional view of a self-aligning roller bearing according to another embodiment.

FIG. 3 illustrates an inclination angle of the retainer 10R and the like. Although the following description will be made with reference to the retainer 10R on the right side in the figure, the retainer 10L on the left side is identical to the retainer 10R on the right side because this embodiment represents an exemplary application to a self-aligning roller bearing 1 including left and right rows of a symmetrical configuration, and overlapping description of the retainer 10L on the left side will be omitted. The pillar portions 12 of the retainer 10R in FIG. 3 extend parallel to a bearing center axis O. The pillar portions 12 may be inclined toward an inner diametric side of the retainer as they extend to their distal ends, as in the example shown in FIG. 13.

In FIG. 3, the retainer 10R has an inclination angle $\beta2$ in the following relation:

$$0 \leq \beta2 \leq \alpha2,$$

with respect to a roller maximum diameter angle $\alpha2$ which is an inclination angle at a position where the rollers 5 have the maximum diameter. The inclination angle $\beta2$ of the retainer is set in this manner, so that pocket surfaces 12a of the retainer 10R hold the rollers 5 at the maximum diameter positions. Further, the retainer 10R is provided with tapered portions 13 on outer diametric surfaces of distal ends of the pillar portions 12, as described later.

As for the "inclination angle $\beta2$ of the retainer 10R," for example, in a case where the pocket surfaces 12a of the pillar portions 12 of the retainer 10R are cylindrical surfaces, the inclination angle $\beta2$ of the retainer is an angle defined by the center line C2 of each cylindrical surface with respect to a retainer axis (bearing center axis O). The "inclination angle $\beta2$ of the retainer" may be an inclination angle of an outer diametric surface of the retainer 10R or an inclination angle of an inner diametric surface of the retainer 10R.

Figure 4:
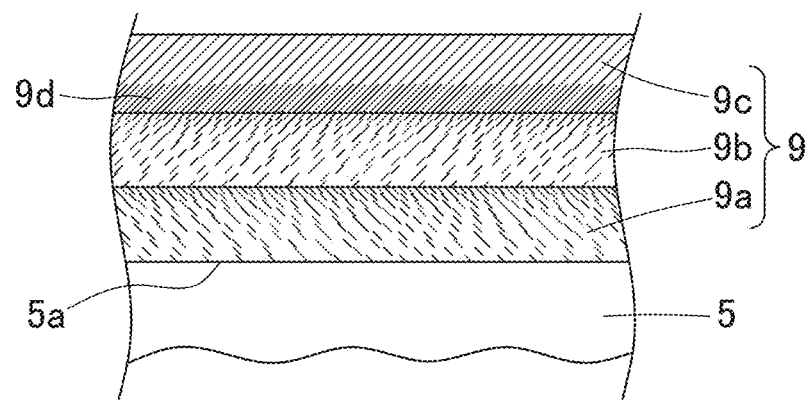
FIG. 4 is a schematic sectional view illustrating a structure of a DLC coating on a roller surface of the self-aligning roller bearing.

The rollers 4, 5 in the respective rows have a DLC coating 9 having a multilayer structure (3 layers or more) on their outer peripheral surfaces, as schematically shown by the cross section of a surface part of a roller 5 in the right row in FIG. 4. Although the following description is made with reference to the coating 9 of the rollers 4, 5, the raceway surfaces 2a, 2b, 3a of the inner ring 2 and the outer ring 3 may also be coated with a DLC coating 9, as with the rollers 4, 5. The DLC coating 9 may have a film thickness of 2.0 μm or larger. In the present embodiment, the DLC coating 9 includes three layers, namely, a base layer 9a, a mixed layer 9b, and a top layer 9c sequentially disposed from a base material side of the rollers 4, 5.

The base material of the rollers 4, 5 has an external surface having a surface roughness expressed by an arithmetic average roughness Ra≤0.3 and a root mean square slope R$\Delta$q≤0.05. The respective layers 9a, 9b, 9c of the DLC coating 9 having the multilayer structure have stepwisely increasing film hardnesses such that a layer situated closer to outside has a higher hardness.

The DLC coating to the outer peripheral surfaces of the rollers 4, 5 enhances wear resistance. Provision of the DLC coating 9 improves wear resistance, whereas it necessitates securement of peeling resistance. In order to improve peeling resistance, the following features are employed. The DLC coating 9 has a multilayer structure which provides excellent adhesion to the base material. The DLC coating 9 has a film thickness of 2.0 μm or larger. The outer peripheral surfaces where the DLC coating 9 is to be applied have, as values indicating its roughness, an arithmetic average roughness Ra of 0.3 or smaller and a root mean square slope R$\Delta$q of 0.05 or smaller, so that they are less aggressive to an opposing material (the raceway surfaces 2a, 2b, 3a of the inner ring 2 and the outer ring 3). Further, the DLC coating 9 has stepwisely increasing hardnesses within the multilayer structure, so that it can achieve high adhesion.

The material of the rollers 4, 5 and the like as well as the DLC coating 9 will be specifically described. The rollers 4, 5, the inner ring 2, and the outer ring 3 are made of an iron-based material. The iron-based material may be any steel material which is commonly used for bearing members, such as high carbon chrome bearing steel, carbon steel, tool steel, and martensitic stainless steel. Preferably, these bearing members have a Vickers hardness of Hv650 or higher on their surfaces on which the DLC coating 9 is to be formed. Hardness of Hv650 or higher makes it possible to reduces a hardness difference between the base material and the DLC coating 9 (base layer) so as to improve adhesion.

Prior to forming a coating layer, a nitride layer may be preferably formed by nitriding process on the surfaces of the rollers 4, 5 on which the DLC coating 9 is to be formed. The nitriding process may preferably be plasma nitriding process which hardly forms, on the base material surfaces, an oxidation layer which hinders adhesion. Further, the surface after the nitriding process may preferably have a Vickers hardness of Hv1000 or higher in order to further enhance adhesion of the DLC coating 9 (base layer).

The base material surfaces of the rollers 4, 5 on which the DLC coating 9 is to be formed (i.e., on which the base layer 9a is to be applied) have an arithmetic average roughness Ra from 0.1 μm to 0.3 μm and a root mean square slope RΔq of 0.05 or smaller. The root mean square slope RΔq may preferably be 0.03 or smaller, and more preferably 0.02 or smaller. The arithmetic average roughness Ra and the root mean square slope RΔq are determined in accordance with JIS B 0601 and are measured using a contact type or non-contact type surface roughness tester or the like. A specific measurement condition may be as follows: measurement length of 4 mm and cut off of 0.8 mm. The base material surfaces have a root mean square slope RΔq of 0.05 or smaller, so that a roughness curve can have gentle peaks, and protrusions can have larger radii of curvature so as to suppress local surface pressure. This also makes it possible to suppress electric field concentration at the micro level due to the roughness during coating, to prevent a local change in film thickness and hardness, and thereby to improve peeling resistance of the hard film.

A maximum ridge height Rp calculated from the roughness curve of the base material surfaces may preferably be 0.4 μm or lower. The maximum ridge height Rp is determined in accordance with JIS B 0601. The relation between the maximum ridge height Rp calculated from the roughness curve and the arithmetic average roughness Ra may preferably satisfy $1 \leq Rp/Ra \leq 2$, and more preferably $1.2 \leq Rp/Ra \leq 2$.

A skewness Rsk calculated from the roughness curve of the base material surfaces may preferably be a negative value. The skewness Rsk is a measure of distortion and may more preferably be −0.2 or smaller. The skewness Rsk quantitatively expresses the vertical symmetry of an amplitude distribution curve about a mean line placed at the center, that is, it serves as an indicator of deviation of the surface roughness with respect to the mean line. The skewness Rsk is determined in accordance with JIS B 0601. A negative skewness Rsk indicates that a roughness profile appears concave down (i.e., forms valleys) and have many flat portions on the surface. Consequently, the surface does not have many protruding portions and thus is unlikely to cause stress concentration due to protrusions. To reduce roughness, a technique of eliminating surface protrusions by colliding a polishing medium against the surface (such as barrel polishing) might be employed. Care should be taken in such a case because new protrusions may be formed depending on processing conditions, which may cause inversion of the skewness Rsk to a positive value.

FIG. 4 is a schematic sectional view illustrating the structure of the DLC coating 9. As shown in FIG. 4, the DLC coating 9 has a three-layer structure including: (1) a base layer 9a directly formed on the surfaces of the rollers 4, 5 and mainly containing Cr and WC; (2) a mixed layer 9b formed on the base layer 9a and mainly containing WC and DLC; and (3) a top layer 9c formed on the mixed layer 9b and mainly containing DLC. The mixed layer 9b is formed such that the content of WC in the mixed layer continuously or stepwise decreases from the side of the base layer 9a to the side of the top layer 9c, while the content of DLC in the mixed layer continuously or stepwise increases. In the present embodiment, the DLC coating 9 has the above-described three-layer structure as its film structure so as to avoid sharp change in physical properties (hardness, elastic modulus, etc.).

Since the base layer 9a contains Cr, the base layer is compatible with the base material made of a cemented carbide material or an iron-based material and provides excellent adhesion to the base material in comparison with cases where W, Ti, Si, or A1 is used. In addition, WC used in the base layer 9a has a hardness and an elastic modulus intermediate between those of Cr and DLC and hardly causes residual stress concentration after film formation. Further, the base layer 9a preferably has a gradient composition having a decreasing content of Cr and an increasing content of WC from the side of the roller surface to the side of the mixed layer 9b. This provides excellent adhesion on the both surfaces facing the roller surface and the mixed layer 9b.

The mixed layer 9b is an intermediate layer interposed between the base layer and the top layer. As discussed above, WC used in the mixed layer 9b has a hardness and an elastic modulus intermediate between those of Cr and DLC and hardly causes residual stress concentration after film formation. The mixed layer 9b has a gradient composition having a decreasing content of WC and an increasing content of DLC from the side of the base layer 9a to the side of the top layer 9c, so that the mixed layer has excellent adhesion on the both surfaces facing the base layer 9a and the top layer 9c. Also, WC and DLC are physically bonded in the mixed layer, so that breakage in the mixed layer can be prevented. Further, the increasing content of DLC toward the top layer 9c contributes to excellent adhesion between the top layer 9c and the mixed layer 9b. The mixed layer 9b is a layer which serves to bond highly non-adhesive DLC to the base layer 9a by the presence of WC due to the anchor effect.

The top layer 9c is a film that mainly contains DLC. The top layer 9c preferably includes a gradient layer portion 9d which is located adjacent to the mixed layer 9b and has continuously or stepwisely increasing hardness from the side of the mixed layer 9b. The gradient layer portion can be formed by continuously or stepwisely changing (increasing) a bias voltage so as to avoid a sharp change in the bias voltage, where different bias voltages are applied to the mixed layer 9b and to the top layer 9c. The gradient layer portion 9d has a graded hardness as a consequence of changing the bias voltage in such a manner. The reason why the hardness increases continuously or stepwisely is that a composition ratio of the graphite structure ($SP^2$) and the diamond structure ($SP^3$) in the DLC structure shifts toward the latter due to the increasing bias voltage. This eliminates a large hardness difference between the mixed layer and the top layer, further enhancing the adhesion between the mixed layer 9b and the top layer 9c.

The DLC coating 9 preferably has a film thickness (total thickness of the three layers) from 2.0 μm to 5.0 μm. A coating having a film thickness below 2.0 μm may be poor in wear resistance and mechanical strength, whereas a coating having a film thickness above 5.0 μm may be easily peeled off. Further, a proportion of the thickness of the top layer 9c to the film thickness of the DLC coating 9 is preferably 0.8 or lower. Where the proportion exceeds 0.8, the gradient structure for physically bonding WC and DLC in the mixed layer 9b tends to be discontinuous, leading to deterioration of adhesion.

The DLC coating 9 having the three-layer structure including the base layer 9a, the mixed layer 9b, and the top layer 9c of the above compositions provides excellent peeling resistance.

FIG. 5 to FIG. 12 show an exemplary configuration of the retainer 10R on the rear side (right side). The retainer 10L (FIG. 1) on the front side (left side) has like features as those described for the retainer 10R on the rear side with reference to FIG. 5 to FIG. 12, and overlapping description will be omitted.

Figure 5:
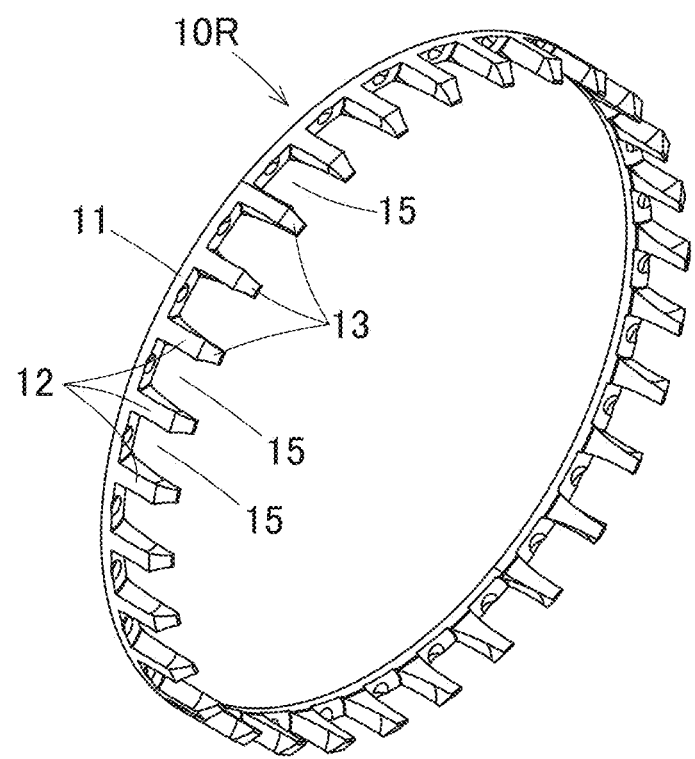
FIG. 5 is a perspective view showing an example of a retainer for the self-aligning roller bearing.
Figure 10:
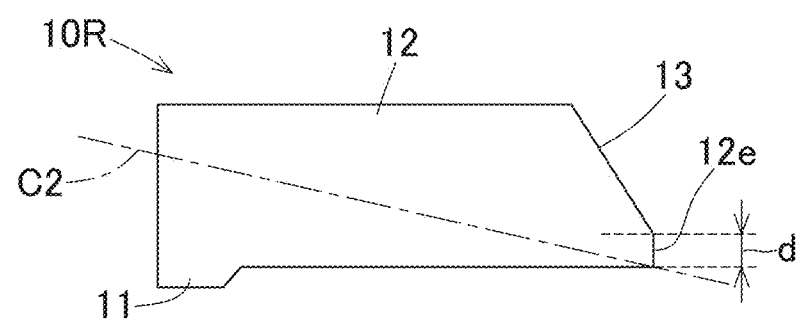
FIG. 10 is a sectional view of a pillar portion of the retainer.
Figure 11:
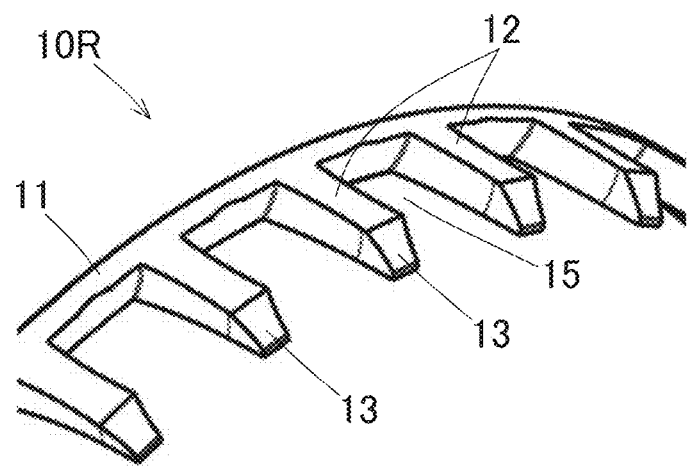
FIG. 11 is a partial perspective view of the retainer.
Figure 12:
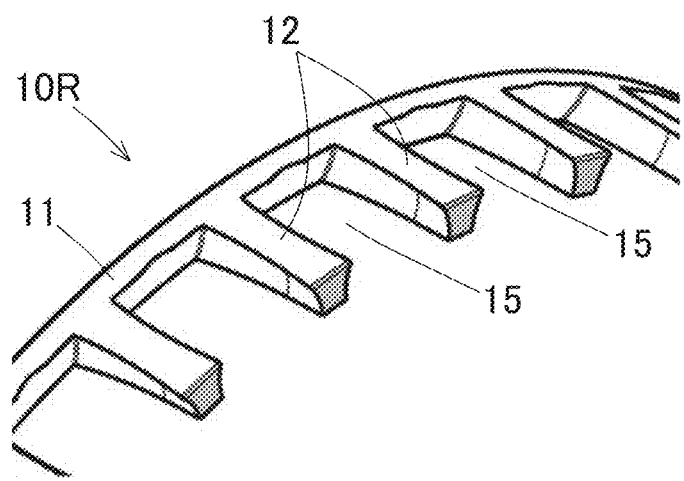
FIG. 12 is a partial perspective view of a variant of the retainer.

In FIG. 5, each pillar portion 12 of the retainer 10R has a lengthwise portion that is shaped from a columnar portion having a same basic cross-sectional shape (a shape illustrated in FIG. 7 with imaginary lines) by removing a volume so as to have a cylindrical pocket surface 12a and is provided with a tapered portion 13 at the distal end thereof. The basic cross-sectional shape is defined by an outer peripheral surface 12b and an inner peripheral surface 12c each defining a part of a cylindrical surface and flat side surfaces 12d extending in the radial direction on opposite sides. The cylindrical surface defining a pocket surface 12a has a slightly larger diameter than the maximum diameter of a roller 5. The pocket surface 12a are formed as cylindrical surfaces having the center line C2 (FIG. 1, FIG. 3). The center line C2 is inclined such that distal ends of the pillar portions approach the inner diametric side with respect to the extension direction of the pillar portions 12, as shown in FIG. 10.

Figure 6:
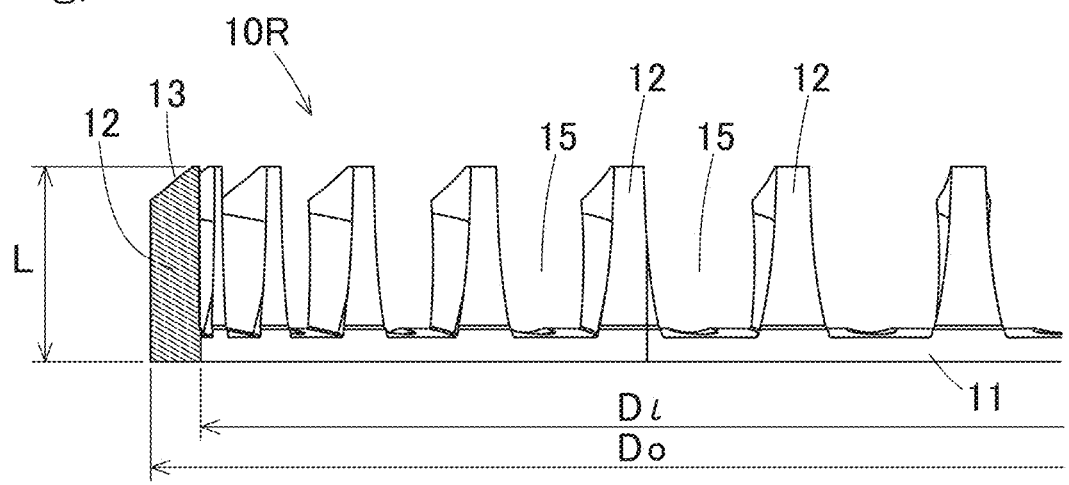
FIG. 6 is a partially enlarged cutaway plan view of the retainer.
Figure 7:
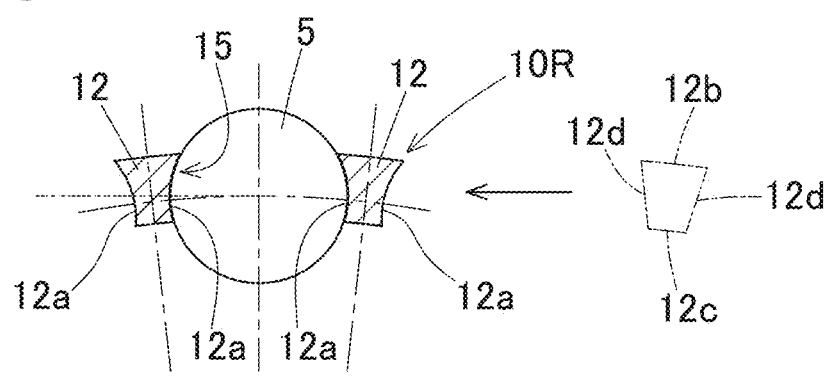
FIG. 7 is a sectional view illustrating a relation between a pocket and a roller of the retainer.
Figure 8:
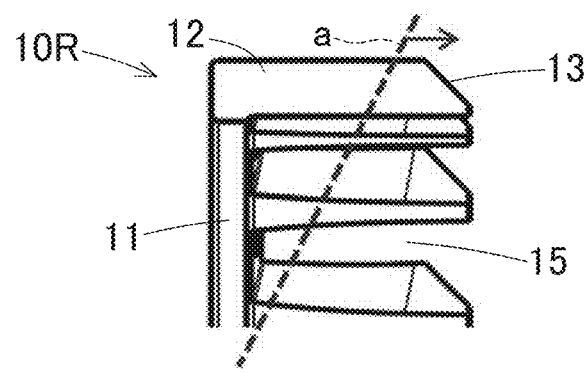
FIG. 8 is a partial sectional view of the retainer.

The retainer 10R as shown in FIG. 6 has an outer diameter Do, an inner diameter Di, and a pillar portion length L which are optimized in the following manner. The annular portion 11 of the retainer 10R has an outer diameter Do larger than a pitch circle diameter PCD of the arrangement of the rollers 5, and the annular portion 11 has an inner diameter Di smaller than the pitch circle diameter PCD (FIG. 3). For example, the outer diameter Do of the annular portion 11 may be in a range of PCD×102% to PCD×105%. For example, the inner diameter Di of the annular portion 11 may be in a range of PCD×95% to PCD×98%. The pillar portions 12 may have a length L (specifically, a length L of parts of the pillar portions 12 which define the pockets 7) equal to or shorter than 65% of the roller length L2 (FIG. 2, FIG. 3).

Each of the tapered portions 13 (FIG. 5 to FIG. 6, FIG. 8 to FIG. 10) is formed on an outer diametric surface of a distal end of a pillar portion 12 in such a way that the tapered portion approaches the inner diametric side of the retainer as the tapered portion extends to a most distal end thereof. Each tapered portion 13 extends from a position on a line "a" (indicated with a dashed line in FIG. 8) defining a maximum diameter angle of a roller 5 or from a position closer to the distal end of the pillar portion with respect to the line "a". That is, each tapered portion 13 is formed, on a pillar portion 12, from the position on the line "a" defining the maximum diameter angle of a roller 5 to the distal end of that pillar portion. In other words, the tapered portions 13 start extending from the positions M (FIG. 3) where the rollers 5 have the maximum diameter on the center line C2 or the positions closer to the distal ends of the pillar portions with respect to the positions M.

Figure 9:
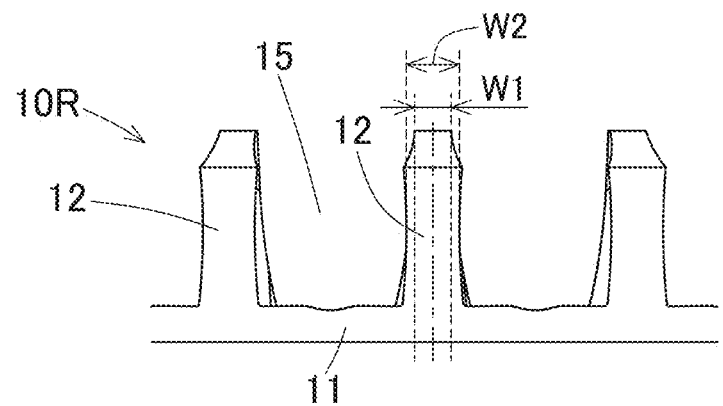
FIG. 9 is a partially enlarged plan view of the retainer.

The pillar portions 12 are formed with the tapered portions 13, and the pocket surfaces 12a formed as cylindrical surfaces are inclined with respect to the axial direction in which the pillar portions 12 extend, so that each pillar portion 12 has a smallest pillar portion width W1 at the most distal end of that pillar portion 12 when the pillar portion are viewed from outside in a radial direction of the retainer toward a center side of the retainer, as shown in FIG. 9, and the pillar portion width W1 is smaller than a width W2 of the portion before that tapered portion 13 starts extending. Further, each pillar portion 12 has a distal end face 12e having a smaller radial dimension d (FIG. 10) than that in the case there the tapered portion 13 is not provided.

The retainers 10L, 10R may be made of a material such as bearing steel or other iron-based materials, or brass materials.

According to the retainer 10R having this constitution, since the pocket surfaces 12a of the pillar portions 12 are formed as cylindrical surfaces, the rollers 5 can be reliably retained. Further, since the tapered portions 13 are formed, incorporation of the rollers 5 is facilitated.

The relation between the tapered portions 13 and ease of incorporation of the rollers 5 will be described. The center line C2 of each of the cylindrical surfaces serving as the pocket surfaces 12a of the pillar portions 12 is inclined such that the distal end of each cylindrical surface extends toward the inner diametric side with respect to the direction in which the pillar portions 12 extend. Accordingly, if the tapered portions 13 (see FIG. 11) are not provided as in the case of the example of FIG. 12, each pillar portion 12 would have a largest pillar portion width at the most distal end of the pillar portion when viewed from the outside in the radial direction toward the center side of the retainer. Therefore, incorporation of the rollers 5 into the pockets 15 would be difficult because the wider outer diametric portions of the distal ends of the pillar portions 12 would interfere such an operation, and the wide outer diametric portions of the distal ends of the pillar portions 12 are useless parts which do not contribute to strength or functionally provide any good effect.

In the present embodiment, the tapered portions 13 are formed, so that the distal ends of the pillar portions have a reduced circumferential width W1 (FIG. 9) and a reduced radial thickness d (FIG. 10). This facilitates incorporation of the rollers 5 and reduces the weight of the retainer 10R. Since incorporation of the rollers 5 is facilitated, it is not necessary to greatly deform the retainer 10R during the incorporation, so that shape deterioration due to deformation of the retainer 10R is prevented.

Since the tapered portions 13 are formed so as to eliminate the useless parts, the tapered portions 13 do not affect retainment of the rollers 5, and it is preferable to form the tapered portions 13 in terms of weight reduction. It should be noted that if the tapered portions 13 are too long, the retainment of the rollers 5 is deteriorated. Therefore, the tapered portions extend from the positions M (FIG. 9) where the rollers 5 have the maximum diameter or from the positions closer to the distal ends of the pillar portions with respect to the positions M, so that the retainment of the rollers 5 is ensured. In terms of ease of incorporation of the rollers 5, the distal end of each tapered portions 13 preferably has a smaller radial thickness d (FIG. 10). However, since the pocket surfaces 12a in the form of cylindrical surfaces are formed from the distal end side of the pillar portions 12 by drilling processing, it is necessary to leave flat surfaces at the distal ends, so that it is preferable to reduce the radial thickness to the extent that the processing is not affected.

The above embodiment is described with reference to an exemplary application to the self-aligning roller bearing 1 having a laterally symmetrical configuration. However, the present invention may be applied to a self-aligning roller bearing having a laterally asymmetrical configuration, such as a self-aligning roller bearing 1 in which left and right rows of rollers have different contact angles θ1, θ2, as in the embodiment shown in FIG. 13.

Figure 14:
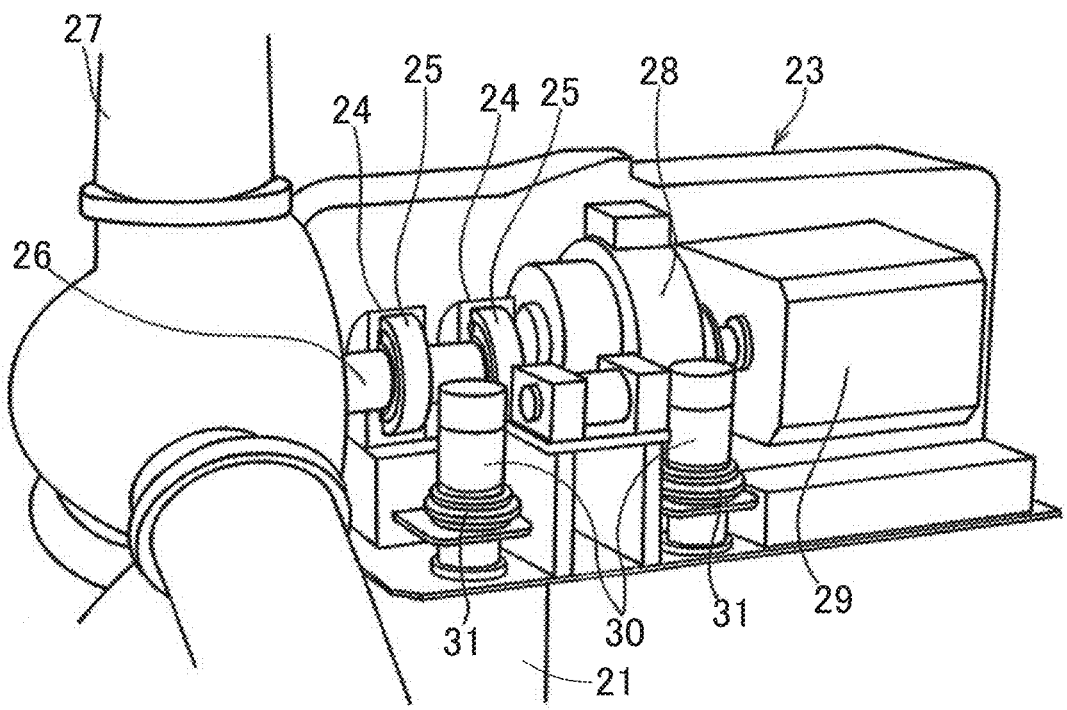
FIG. 14 is a perspective view showing an example of a main shaft support device of a wind power generator in a partially sectioned manner.
Figure 15:
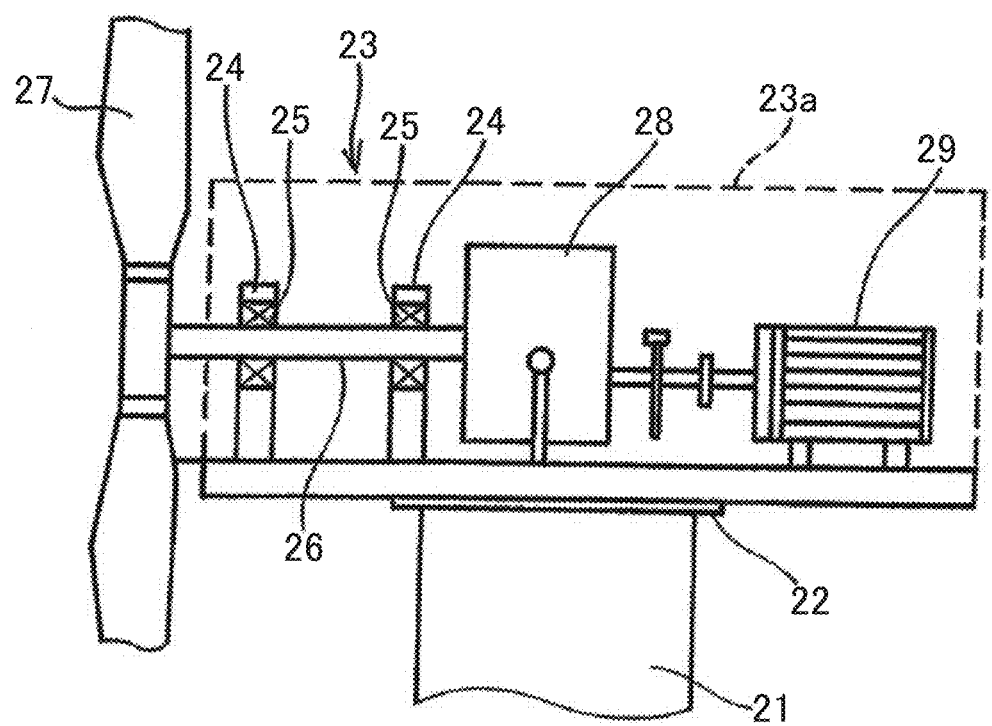
FIG. 15 is a cutaway side view of the main shaft support device.

FIG. 14 and FIG. 15 illustrate an example of a main shaft support device of a wind power generator. A casing 23a of a nacelle 23 is horizontally turnably disposed on a support 21 via a revolving seat bearing 22 (FIG. 15). A main shaft 26 is rotatably fitted within the casing 23a of the nacelle 23 via main shaft support bearings 25 disposed in bearing housings 24, and blades 27 that serve as rotor blades are attached to a portion of the main shaft 26 projected outside of the casing 23a. The other end of the main shaft 26 is connected to a speed increasing gear 28, and an output shaft of the speed increasing gear 28 is coupled to a rotor shaft of a power generator 29. The nacelle 23 is revolved to any angle by revolving motors 30 via reduction gears 31. The illustrated example has two main shaft support bearings 25 arranged in series but may have a single main shaft support bearing.

Although the present invention has been described in connection with the embodiments thereof, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

What is claimed is:

1. A self-aligning roller bearing configured to support a main shaft of a wind power generator, the self-aligning roller bearing comprising:
    an inner ring; an outer ring; two rows of rollers interposed between a raceway surface of the inner ring and a raceway surface of the outer ring; and a retainer configured to retain the respective rows of the rollers, wherein the raceway surface of the outer ring has a spherical shape continuously extending over the two rows of the rollers, each of the rollers having an outer peripheral surface having a cross-sectional shape matching the raceway surface of the outer ring,
    each of the rollers has a DLC coating having a multilayer structure on the outer peripheral surface,
    the DLC coating has a film thickness of 2.0 μm or larger,
    a base material of each of the rollers has an external surface having a surface roughness of Ra≤0.3 μm and RΔq≤0.05,
    the DLC coating having the multilayer structure includes layers having stepwisely increasing film hardnesses such that a layer situated closer to outside has a higher hardness,
    wherein the retainer includes an annular portion and a plurality of pillar portions axially extending from the annular portion at a plurality of locations in a circumferential direction of the annular portion such that the retainer is formed in a comb shape, and
    wherein each of the pillar portions has a smallest pillar portion width on a radially inner side of the pillar portion at a distal end of the pillar portion.

2. The self-aligning roller bearing as claimed in claim 1,
    wherein each of the pillar portions have pocket surfaces which are formed as cylindrical surfaces, a center of each of the cylindrical surfaces being inclined to approach the radially inner side of the pillar portions, and
    each of the pillar portions is formed with a tapered portion on an outer diametric surface, the tapered portion approaching an inner diametric side of the retainer as the tapered portion extends to the distal end of the pillar portion.

3. The self-aligning roller bearing as claimed in claim 2, wherein the retainer has, with respect to a pitch circle diameter (PCD) of an arrangement of the rollers,
    an outer diameter in a range of PCD×102% to PCD×105%, and
    an inner diameter in a range of PCD×95% to PCD×98%, and
    parts of the pillar portions which define the pockets have a length equal to or shorter than 65% of a roller length.

4. The self-aligning roller bearing as claimed in claim 2, wherein the tapered portion of each of the pillar portions of the retainer extends from a position where the rollers have a maximum diameter or from a position closer to the distal end of that pillar portion with respect to the position at the maximum diameter.

* * * * *